Aug. 13, 1963 P. D. MEEK ETAL 3,100,763
CONTROLLED SUSPENSION POLYMERIZATION
Filed Aug. 3, 1959 2 Sheets-Sheet 2

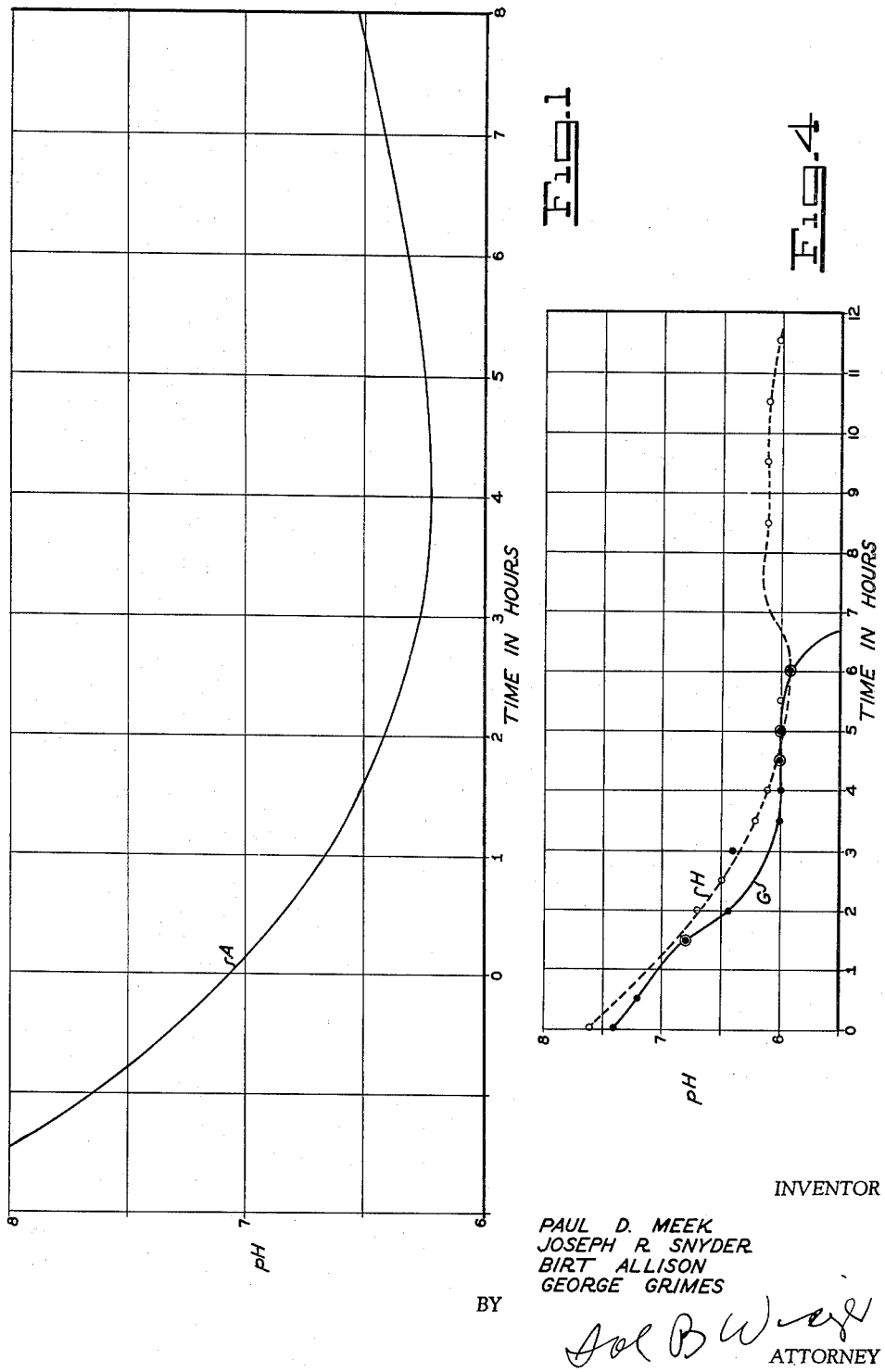

INVENTORS
PAUL D. MEEK
JOSEPH R. SNYDER
BIRT ALLISON
GEORGE GRIMES
BY
ATTORNEY

United States Patent Office 3,100,763
Patented Aug. 13, 1963

3,100,763
CONTROLLED SUSPENSION POLYMERIZATION
Paul D. Meek, Joseph R. Snyder, Birt Allison, and George Grimes, Big Spring, Tex., assignors to Cosden Petroleum Corporation, Big Spring, Tex., a corporation of Delaware
Filed Aug. 3, 1959, Ser. No. 831,269
3 Claims. (Cl. 260—93.5)

This invention relates to suspension polymerization and provides a controlled procedure more reliable to effect a satisfactory suspension polymer bead product by a continuous pH control through all phases of the reaction. Despite operation of a suspension polymer system in the usual ranges of necessary components, a large percentage of failures occur which we have found, according to the present invention, can be prevented by continuous pH control.

In operation of a suspension system to produce polymer in ready flowable granular bead-like form by agitating polymerizable reaction components as a suspension in water, numerous control elements have been proposed and are followed as common, if not standard procedure in this art. Each control factor appears usually to have a desirable effect on the successful production of polymer in bead form from liquid polymerizable substance suspended as finely divided droplets by agitation in water. For instance, difficultly soluble phosphates of the group, calcium, barium and magnesium, have been proposed for their function as dispersing agents and suspension stabilizers to inhibit the intermediate or ultimate agglomeration of the particles of polymerizable substance.

These phosphates have been suggested for use in limited range of particle size and in quantity ratio with respect to other components of the suspension system. For instance, a common particle size range is a submicron, defined as 0.2 to 0.005 micron, but according to a preferred method of forming the particles described below, the phosphate particles may be of even smaller size. The quantity of phosphate has been suggested to range from about 0.005 to about 5% of the suspension and most usually ranges in the practice of the art, from about 0.1 to 3%. They have also been proposed to be used with various surface active agents, typically anionic agents in quantity ranging from .005 to 2% by weight of the suspension system, as well as monomer soluble dispersing agents, such as phosphatides in quantity ranging from 0.0003 to 0.004% by weight of the suspension system. The system further includes a catalyst preferably of the peroxy type, such as dibenzoyl, ditertiary butyl benzoyl, dicaproyl and dilauroyl peroxides and similar known peroxide catalysts. Such catalysts are used in quantity up to about 1%, most usually ranging from about 0.1 to 0.5% by weight of the monomer.

The suspension system, as further described in the White application (below), can further have added thereto various quantities of acids and buffering salts, for instance, acetic acid, acetate salts usually of the alkali or alkaline earth metals. Further suggested has been various chain transfer agents such as small quantities of mercaptan, for instance, dodecyl mercaptan to vary the molecular weight of the polymer, colors, stabilizers and other auxiliary agents commonly useful with the bead polymers.

The present system contemplates the polymerization of vinyl aromatics such as styrene, however, the polymerization of any suspension polymerizable ethylenically unsaturated monomer, such as alkyl styrenes, for example, methyl and dimethyl styrene, halogenated styrenes, for example, 2-chlorostyrene, vinylpyridine, divinylbenzene and the like, is effected by the method of this invention.

It is also useful in the suspension polymerization of vinyl chloride, vinyl acetate, vinyl propionate, vinylidene chloride, the lower esters, for example methyl or ethyl esters of acrylic or methacrylic acids, acrylonitrile, butadiene, chloroprene and mixtures of such ethylenically unsaturated monomers. It is useful for polymerizing a suspension of such monomers or mixtures thereof, as a monomer solution of other polymers, such as latices of natural and synthetic rubbers, such as a monomer solution of butadiene/styrene copolymer, for example, GRS rubber, dissolved in styrene monomer. Other typical synthetic rubber polymers that may be dissolved in the liquid monomer are polybutadiene, copolymers of butadiene and acrylonitrile and copolymers of butadiene with isobutylene.

A typical water soluble surfactant is the alkali metal salt of an alkyl sulfate ester having about 5 to 9 carbon atoms such as sodium octyl sulfate, but others, like sodium caproyl sulfate, may be used. As the phosphatide when used, we prefer lecithin as described and claimed in a copending application of Roy A. White, also assigned to applicants' present assignee, Serial No. 781,441, filed December 19, 1958.

Overall the problem of suspension polymerization has devolved to effective continuous polymerization of the liquid polymerizable material suspended by agitation in water together with accurately proportioned and distributed dispersing agents, extenders, catalyst and other necessary elements of a suspension system, as listed, to establish and maintain such system whereby the particles polymerize as such into hard beads without coalescing into large masses at any stage of the polymerization. For instance, sometimes during the reaction at early stages, where the raw material is monomeric or low molecular weight polymer, coalescing takes place of semi-solid or liquid particles and the coalesced product collects about the stirring means thus forming what is known as "lollipops," a large soft low molecular weight polymer mass highly tacky which clings to the stirrer. Such mass when once formed or begun to form in the suspension system, destroys all possibility of producing polymer beads in that particular batch. That "lollipop" type of polymer, of course, can form at any stage intermediate to the production of high molecular weight polymer or relatively hard polymeric bead material.

On the other hand, sometimes a coalescing of particles takes place near the termination of the polymerization reaction, that is, after relatively hard polymer beads have been formed in the system, which, however, have relatively tacky surfaces at the raised temperatures of the polymerization, and the coalescing of such particles is known as "sugar clump," because the beads coalesce into separate but large granular clumps of polymer in the suspension, which too comprises a failure of the particular batch.

Each of the various control means as listed above, such particularly as the phosphate particles, the surface active agents and catalysts in their small but definite quantity ranges, usually produce bead polymers when operated within the control range as taught in the art. Nevertheless, it is our experience that even operating such suspension system closely controlled in the ranges found most of the time to be successful in the art, will produce a substantial number of batches of "lollipop" at some intermediate stage whereby each such batch is lost; and also will ofttimes in final stages produce "sugar clumps" of hard granular bead polymer masses which also result in failure of the batch, again, even when following "normal" conditions of reaction as taught in the art.

We have found that if the total reaction is controlled to a gradually descending pH curve as the polymerization proceeds through the intermediate stages, and to a minimum final pH above about 5.8 as the reaction is completed, hard easy flowing separate polymer beads are invariably produced, without accidental intermediate "lollipop" or final stage "sugar clump" formation. We have found that such constraint of the reaction to a continually descending pH curve, provides a specific norm or standard reaction curve of pH vs. time. If the reaction is controlled to follow such pH curve, as a guide, good bead polymers will invariably be produced. Thus, where the reaction tends to vary in pH from this specific curvature as by an unusual change in the slope of the curve, or a sudden rise in pH, or even when the curve drops at a greater slope than warranted, the application of reagent immediately correcting the pH condition at that point, will save the total suspension batch. That is, such pH corrective measure applied when an apparent pH deviation occurs will prevent the formation of "lollipops," coalescing of polymer particles at an intermediate stage, whereby the reaction may be made to continue to final formation of useful bead polymer. Moreover, in the final finishing stages, if the pH is controlled to prevent the suspension system from falling below about 5.8, then the formation of hard beads that are tacky and tend to clump will be inhibited, whereby free flowing polymer beads will always be produced.

It is believed that one factor which caused some variation in polymerization results from large variation in size of the phosphate particles. In another aspect of this invention, the phosphate particles are formed under constant hot precipitation conditions in situ in the system, whereby the phosphate particles are formed in relatively constant, very small particle size. The phosphate particles being formed under constant condition allows their distribution in the system accordingly to be relatively constant whereby the beads formed in the suspension polymerization therewith is relatively constant and thereby are much improved. Polystyrene beads, for example, as formed by this procedure, are so consistently sized as invariably to be almost entirely retained on a 100 mesh screen, preferably 60 mesh, and to pass through a 40 mesh screen, whereby the beads are of relatively constant size with fewer oversize and fines.

Additional advantages flow from the constant sized beads such as the ease of washing, completeness of bead recovery and superior color and clarity of the clean beads reproducible as such in constant size and quality from batch to batch. Such improved clarity and color indicates that the bead is at the right size. Much larger sizes tend to entrain suspended particles of impurities and much smaller sizes are not washed clear and tend further by their larger surface to accept most of the color from a dye solution, giving an unevenly colored product. These advantageous results are obtained by dissolving the required polymerization quantity of soluble phosphate in the water comprising the suspension held rigidly constant from batch to batch. This water is heated about to boiling, 90 to 100° C., with or without the soluble phosphate, until a solution of the soluble phosphate at the boiling point of water is formed. Thereafter, and with the agitator running, a precipitating solution of calcium, barium or magnesium hydroxide or water soluble salt is added in quantity sufficient to exactly precipitate the phosphate with agitation at the boiling temperature of the solution.

It is found that the precipitation effected, preferably stoichiometrically at the fixed high, preferably boiling, temperature in a fixed quantity of dispersing medium, forms extremely fine submicron, but more uniformly sized, insoluble phosphate, the particles usually being in the range of about 0.0005 to 0.05 micron. That hot suspension may be used immediately, by addition of other components of the suspension system, and formation of the suspension batch by continued agitation of the system.

The suspension necessarily formed according to this preferred procedure usually at the constant boiling point of the water, is not necessarily maintained in that temperature during the subsequent polymerization, but after forming the phosphate suspension it may be cooled to any desirable initial polymerization temperature. As known in the art, any soluble salt or hydroxide, producing alkali earth metal ions of the above listed types, may be used. For instance, to produce calcium phosphate, calcium hydroxide or any water soluble calcium salt such as calcium chloride may be used to precipitate the phosphate as calcium phosphate. The precipitating salt or hydroxide may be used in slight excess to that needed to precipitate the phosphate, and in fact the quantity of an alkaline agent such as calcium hydroxide may be adjusted to raise the pH initially to whatever is initially desired.

An incidental advantage of forming the phosphate particle suspension according to this procedure is that the profile of the pH-time curve becomes more standardized and the bead size more exactly reproducible from batch to batch. While, as indicated, suspension polymerization batches formed with phosphate particles by this preferred hot precipitation procedure has a similar number of occasional failures by variation as described, controls of pH of such system as formed with the phosphate suspension hereof, may be effected in the same manner as herein described for other phosphate suspensions with the advantage, as indicated, of producing superior beads of relatively constant size from batch to batch.

According to one theory of the art (see Larah et al., J. Amer. Chem. Soc., vol. 51, pp. 1100–1109 (1929)), the alkali earth metal phosphates, such as calcium, barium or magnesium, tend to hydrolyze in water to produce some basic (hydroxy) phosphates or hydrates, probably of the formula $3Ca_3PO_4 \cdot Ca(OH)_2$ (calcium hydroxy hexaphosphate) and some free phosphoric acid. The insoluble finely divided submicronic phosphates of this type are set up in the suspension system, either as preformed particles, or formed in situ by hot precipitation as preferred by reaction of trisodium phosphate and a water soluble alkali earth metal salt or hydroxide at a temperature in the range of 90 to 100° C. Stabilizing agents are used therewith which are surface active, and usually comprise sulfate salts of the alkali metals, typically sodium caproyl or octyl sulfate as stated above. Such suspension polymerization system started with the preformed insoluble phosphate particles suspension, or salts forming the same in situ, is more or less highly alkaline, ranging in pH from about 7.5 to 9, at the initial stages of the reaction. The insoluble alkali earth metal phosphate then begins to hydrolyze and to produce some phosphoric acid which will progressively lower the pH of the suspension system. A source of acidity in the suspension system may also be from the reagents and other reaction products formed, such as monomer or lower polymers containing organic acids, which have been inadequately refined to remove all of the acids. Sometimes the peroxy catalyst forms a source of acid. In any case, without intending to be limited to theory as to where the acid comes from, we have found that the pH of the suspension system in the normal suspension polymerization reaction in which no "lollipop" tends to form, follows a specific curve showing continuous drop of pH from slight alkalinity of about 7.5 to 9 down to about 6.0 over an initial polymerization period of several hours, usually exceeding 2½ to 3, as the polymerization normally progresses.

The reaction will usually go more rapidly with larger amounts of catalyst and slower with less catalyst. It will also go more rapidly after the polymerization reaction has been initiated. It will also go somewhat more rapidly at raised temperatures than at low temperatures. Moreover, other necessary, but minor components variable in quantity such as the ratio of precipitating agents and variations in quantity of surface active substances in the reaction suspension appear slightly to affect the rate of reaction. In each case, however, while the absolute pH values will vary at a slightly different rate with time, the overall profile of the curve of each normal suspension polymerization is closely similar to a standard.

We have further discovered that if, during the early or intermediate course of the reaction, such as up to about four hours in a usual polymerization suspension system, the polymerization appears to be inhibited and the reaction is not proceeding normally, that fact will appear on the pH curve, the slope changes, definitely indicating departure of the reaction from the normal, and that suspension is in danger of a "lollipop" forming and the suspension batch will usually be lost in a reasonably short time following the break in the pH curve, unless corrective measures are immediately taken. Such corrective measures, we have found, comprise addition of a small amount of additional catalyst to speed up the reaction. It may also comprise addition of an agent sufficient to adjust the alkalinity or acidity of the reaction medium, to bring its pH to about what the normal pH of the system should be at that point of the reaction. It may and preferably does comprise both addition of catalyst and adjusting of the pH.

After a substantial intermediate period of reaction time, about 2½ to 6 hours, hard bead-like polymer will normally have formed. The pH at that point has reached a low sometimes below 6, sometimes about 5.5 or less. If the pH is allowed to continue to fall below about 5.8, it is found that the bead-like polymer, slightly tacky, will coalesce into granular clusters, comprising sugar clumps, a loss of suspension. Again, while we do not wish to be limited by theory, at the very low pH it is believed that the basic phosphates, produced ultimately by the hydrolysis of the phosphate as the reaction proceeds, and at a temperature above about 70° C., become soluble or change its suspended state in the system at below about the critical pH below about 5.8. Thus, no insoluble (or properly suspended) phosphate particles are available at such low pH to maintain and prevent the slightly tacky polymer beads from coalescing into sugar clumps. In any case, and according to a further aspect of this invention, the system is prevented from going below about pH 5.8, and generally when the suspension system, after several hours of reaction, has dropped in pH as low as about 6, it can be quenched, that is, an alkaline inhibitor is added to prevent the system from going to a lower pH such as by addition of any alkaline salt, for instance, lime or lime salts.

For this purpose, as the polymerization has proceeded for several hours, a pH below about 6, such as 5.8, is reached and hard tacky evenly suspended and substantially polymerized granules have been produced in the suspension system, the system is buffered, or the further acidification is inhibited by addition of any type of alkaline substance, preferably lime or other alkaline salt, in small quantities. The alkaline material is added in quantity of strength only sufficient to maintain the pH in or slightly above the range of 5.8 to 6.0. The system is alkalinized, at least to prevent it from becoming more acid. That addition of alkali may be in the form of adding to the suspension system enough alkaline material such as lime or ammonia, to raise the pH above 6. It may be by adding only small quantities of such alkaline solution at a pH of 5.8 to 6, allowing the polymerization to proceed, and then after a short period, if the pH tends to go lower, adding more, continuing checking the pH of the system to note whether it has remained relatively constant, and adding more alkali only when the pH tends to go lower.

Accordingly, it will be noted that this invention comprises a method of controlling production of suspension polymer relatively secured against inexplicable failures by a pH and catalyst control. That control amounts to carrying out the polymerization reaction in the presence of submicron sized phosphate particles, preferably hot precipitated in situ at high temperatures, while constraining the suspension system to a relatively standardized pH-time profile curve for the system through all stages of the reaction. Whenever, according to this invention, it is apparent that the pH of the system departs from the relatively standardized pH-time profile curve and the reaction has slowed down for some unknown cause, it is treated with small additional quantities of catalyst to accelerate polymerization, that treatment sometimes including some acid. In that manner every probable failure of the batch is overcome. Where, as pointed out, the reaction has reached the final stages and the pH drops to the range of 5.8 to 6, it is controlled by alkalizing, i.e. addition of sufficient alkali is added to raise the pH or constrain the suspension system, preventing the pH from falling below about 5.8 during the finishing.

The invention is further explained with reference to the attached drawings wherein, FIG. 1 is a typical pH-time profile curve, an average of many normal batches;

FIG. 4 illustrates the contrast in pH-time curves of successful inhibitions by control of the pH in the region of 5.8 to 6, and failures by sugar clumping at pH below 5.8.

A normal suspension system, as the term is used herein, comprises a suspension of polymerizable substance in water, usually in ratio of 0.9 to 1.1 of polymerizable substance to 1 of water. Such system contains finely divided submicron sized phosphate particles of the group consisting of calcium, barium and magnesium in variably small quantities, up to about 5% by weight of the suspension system, an anionic surface active agent from about 0.0005% to 2% peroxy catalyst up to about 1% and minute quantities of other minor components. Such normal system, over a large number of normal properly controlled suspension polymerizations, produces a pH-time profile curve as illustrated in FIG. 1. These systems are operated over a wide range of temperatures from about 40–100° C. The systems may further indefinitely contain small quantities of acetic acid or such buffering salts as acetates, and phosphatides. Sometimes the system is set up by adding the finely divided preformed phosphate particles to the suspension and sometimes, according to another aspect of this invention, the phosphates are formed in suspension by hot precipitation, at a temperature of 90–100° C., of soluble phosphates with lime or other alkaline earth metal hydroxide soluble salt to form the insoluble phosphate particles in situ in the system.

Figure 2:
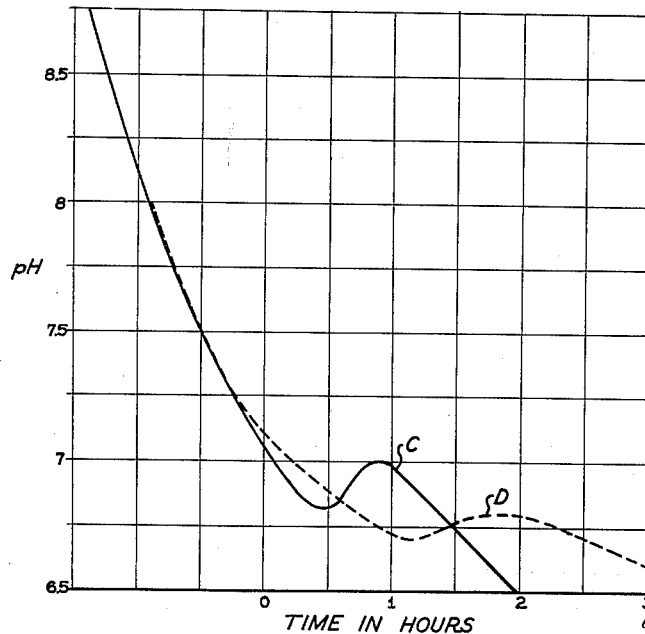
FIG. 2 illustrates two typical departures at intermediate polymerization stages from the relatively standard pH-time profile of FIG. 1, presaging failure of each batch.

Such normal suspension system, as thus defined, most often gives a successful polymerization to produce beads in a typical pH-time curve as shown by FIG. 1. However, a large percentage of bead polymerizations attempted in normal suspension systems within the limits given above, fail for reasons not known. Typical failures, however, are found according to this invention, to be preceded by a break in the normal curve of pH vs. time as illustrated in the several curves of the drawings, particularly FIGS. 2 and 4. According to this invention therefore, those failures can be prevented by addition of small quantities of alkaline materials, added at the proper time to adjust the system to a normal curve. Since, as shown in the curves of FIG. 2, there has been an apparent lag in the polymerization whereby the pH did not drop as expected by the normal profile curve, FIG. 1, it is also often desirable to add more catalyst to accelerate the polymerization slightly. When the pH of a normal suspension system appears at an intermediate stage to depart from the usual profile curve, FIG. 1, small quantities, usually less than 0.1% by weight of the system of peroxy catalyst are added. Further test of the pH of the adjusted system will show whether the normal pH to be expected has been achieved. If not, additional quantities of catalyst and sometimes small quantities of acetic acid are added. When the curve appears to be normal, polymerization will continue and the expected failure will have been avoided for that suspension batch.

In the region of the end point of the polymerization, that is, after about 3–4 hours' reaction, as seen in the curve, FIG. 4, the pH of the curve will have dropped to about 6, and will tend to descend below 6 and even below 5.5 as shown in FIG. 4C. That polymer can and will usually clump into hard granular masses if the pH is allowed to fall below 5.5, and often will, even when the pH goes below 5.8. This, as pointed out and illustrated in FIG. 4H, is overcome by adding alkaline material, such as lime or other alkaline substances, dilute caustic, ammonia or alkaline salts, like sodium acetate or sodium phosphate whenever the pH goes as low as 5.8.

Figure 3:
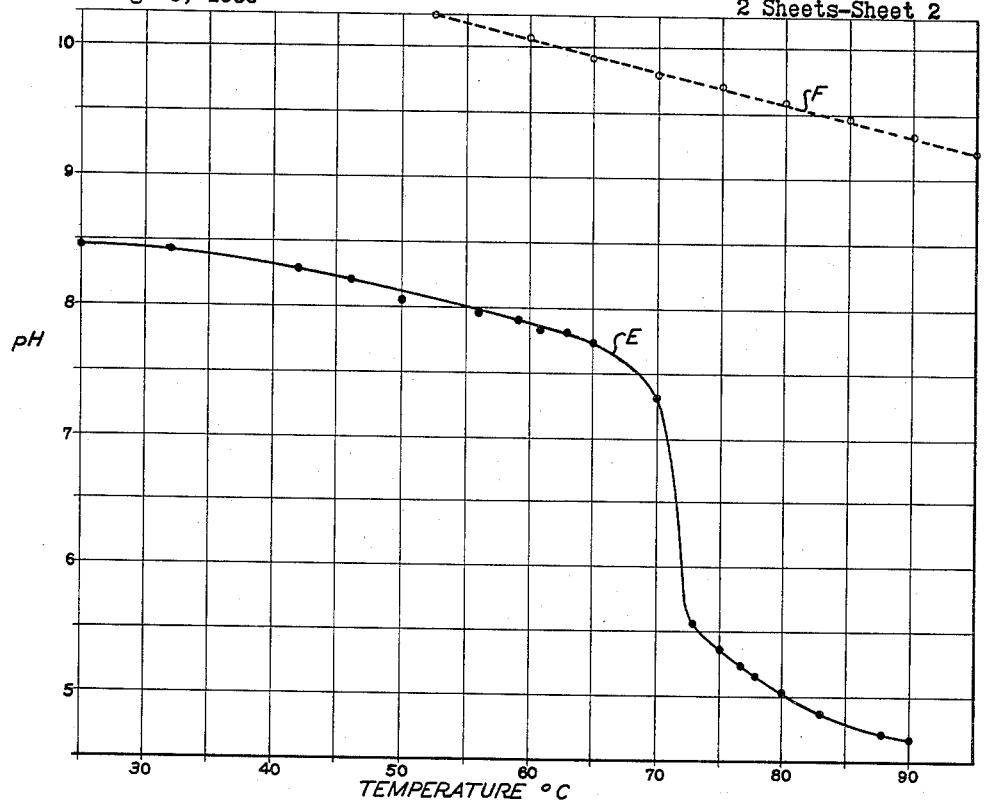
FIG. 3 illustrates lowering of pH with temperature of a suspension system in a high pH curve where the pH lowering is progressive, and an intermediate pH curve where the pH falls rapidly at about 70° C.

For instance, when the pH is raised or held by addition of alkali as in the dotted line curve of FIG. 4H, no sugar clumping of granules occurs. FIG. 4G illustrates a typical drop of pH, near the end point, below 5.5, and the failure of a batch by formation of sugar clumps. Curve 4H shows how the addition of alkali, raising the pH slightly prevents sugar clumping. As indicated, no reasons fully explain the occasional batch failures. The continuous drop in pH by hydrolysis of phospate and production of phosphoric acid is a partial explanation. FIG. 3F shows, at high initial alkalinity of a system, at pH about 10, that the pH will drop with rising temperature. Nevertheless, no sharp break in the curve appears. However, at more moderate initial alkalinity of the system, about 8, the pH may drop very abruptly at temperatures above 70° C., and, as there illustrated, the pH may go much lower in an unbuffered system with temperature rise.

In a typical polymerization in a suspension system, if the phosphate is a soluble phosphate like that of an alkali metal to be precipitated, the soluble salt of the precipitating metal i.e. a soluble salt of the alkali earth metal, is added as a dry solid or as a solution in a small aliquot portion of the water, added with agitation gradually, whereby the hydroxy phosphate of the alkali earth metal is formed in small particles in the agitated aqueous medium. Thereafter, most of the monomer is added as the agitation is continued and finally the remaining components, such as the phospholipid, the peroxy catalyst and acetic acid or acetate salt is added with agitation. The heating of the suspension system, while it may be applied from early stages, actually needs to be applied only during the actual polymerization with agitation so that the heat may take place after the suspension system is established with agitation. The agitation at a desired temperature is continued until the bead-like polymer particles are formed as a suspension in the agitated liquid over a polymerization period, as needed, usually about 6 to 20 hours. Some of the conditions may be varied with the characteristics of the particular monomer being polymerized as will appear from the specific conditions set forth in the following examples:

The invention is illustrated by the following examples:

*Example I*

| | Parts (by weight) |
|---|---|
| Water | 5000 |
| Calcium chloride (CaCl$_2$.2H$_2$O) | 29 |
| Trisodium phosphate (Na$_3$PO$_4$.12H$_2$O) | 39.5 |
| Sodium octyl sulfate | 6 |
| Styrene monomer | 5000 |
| Benzoyl peroxide | 11.6 |
| Lecithin | 0.049 |

In setting up this batch, 4500 parts of water are charged to a reactor, and the trisodium phosphate and the sodium octyl sulfate are added and dissolved with agitation. The calcium chloride is dissolved in the remaining water and this solution is gradually added to the reactor with good agitation. A fine dispersion of calcium phosphate is obtained. That agitation is then stopped and 4500 parts of styrene monomer are added immediately followed by the remaining 500 parts styrene in which the lecithin, and the benzoyl peroxide have been dissolved. Agitation is again started and homogeneous dispersion is obtained. The pH on starting was found to be about 8.5. The temperature is gradually increased to 95° C. within an hour and also maintained at this level with continuous agitation as the polymerization reaction proceeds. The pH descended rapidly reaching about 6.5 at the end of an hour. The batch was then split into two portions.

In one portion, used as control, the agitation was continued, the slope of the curve decreasing whereby the further lowering of the pH almost ceased; in fact, the pH rose slightly. At the end of two hours the polymer and some monomer had begun to coalesce and deposit upon the agitator as soft tacky liquid forming a typical "lollipop" indicating loss of suspension and failure of the control batch. The pH curve of that control batch is illustrated in FIG. 2O.

The other portion of the batch has added thereto a small additional quantity of 0.5 part by weight of benzoyl peroxide. The pH then began to fall rapidly at approximately the original slope over a period of about 3 hours, reaching a minimum of 5.8. At the end of this period 0.5 part of powdered lime was added and the pH rose to 6.3. The polymerization was continued at a pH of about 6.2–6.3 as shown in FIGURE 4H for a period of about 7 hours. Analysis indicated that good polymer beads had formed at the end of 6 hours, analyzing 96.2 complete polymerization. At the end of 7 hours the system showed 97.5 polymerization and at the end of 8 hours upon termination, the beads indicated 98.4% polymerization. The polymer slurry containing the bead-like styrene is agitated to a pH of 3 with hydrochloric acid and centrifuged.

After washing and drying, the product is a clear, non tacky bead-like material of which 90% by weight passes through a 40 mesh Tyler standard screen but remains on a 60 mesh screen.

*Example II*

The following formulation may be used for preparation of a styrene acrylonitrile copolymer:

| | Parts (by weight) |
|---|---|
| Water | 5000 |
| Calcium chloride (CaCl$_2$.2H$_2$O) | 32 |
| Trisodium phosphate (Na$_3$PO$_4$.12H$_2$O) | 40 |
| Sodium octyl sulfate | 6 |
| Styrene monomer | 3500 |
| Acrylonitrile | 1500 |
| Lauroyl peroxide | 40 |
| Lecithin | 0.2 |

The suspension of phosphate particles in water was first prepared as in Example I. The styrene and acrylonitrile were then added with agitation and finally small quantities of styrene in which the lecithin and peroxide had been dissolved were added. The initial temperature was 40° C. The temperature was allowed to increase to about 70° C. in the first hour. The initial pH was 7.4 and this gradually dropped over a period of 6 hours to about 5.5, the temperature then being gradually raised to about 100° C. At this point the batch was divided into two sections, the first remained as described as a control, and the second having added three parts of calcium hydroxide to slightly raise the pH to 5.8 with continued agitation. The temperature was slightly raised after about 6 hours to 90° C. and in the control batch the bead-like polymer coalesced into a hard granular mass having the granular appearance of a clump of sugar. The alkalinized batch, however, remained as an unchanged suspension. Gradually, after 10 hours, live steam was padded into the control mass to steam volatilize any unreacted styrene and acrylonitrile. The control as indicated, at the end of 10 hours had settled as large sugar clumps. The alkalinized batch was acidified to a pH of 3, centrifuged, washed and dried as in the preceding example, to obtain clear hard bead-like styrene acrylonitrile copolymer with high impact strength.

Example III

| | Parts (by weight) |
|---|---|
| Water | 5000 |
| Calcium chloride ($CaCl_2.2H_2O$) | 28 |
| Trisodium phosphate ($Na_3PO_4.12H_2O$) | 39 |
| Sodium octyl sulfate | 6 |
| Styrene monomer | 5000 |
| Benzoyl peroxide | 12.5 |
| Lecithin | 0.047 |
| Acetic acid | 0.29 |

4500 parts of the water are charged to a reactor, and the trisodium phosphate and the sodium octyl sulfate are added and dissolved with agitation. The calcium chloride is dissolved in the remaining water and this solution is gradually added to the reactor with good agitation. A very fine dispersion of calcium hydroxyphosphate is obtained.

The agitation is stopped and 4500 parts of styrene monomer are added, immediately followed by the remaining 500 parts styrene in which the lecithin, the benzoyl peroxide and the acetic acid have been dissolved.

Agitation is started and a homogeneous dispersion is soon obtained. At the end of 6 hours the batch was divided evenly into a control and an experimental batch. The temperature of each was raised to 95° C. with continued agitation. The control batch pH following curve FIG. 4G reached a level of about 5.3 and sugar clumps began to coalesce, that is, particles of beads floated to the top of the system in large clumps of hard granules which adhered together. In the separated experimental batch, when it has reached a pH of 5.7, 1.0 part of concentrated ammonium hydroxide was added which raised the pH to about 6.2 so that with continued heating and agitation the pH had descended no lower than about 5.8 at the end of ten hours. The experimental batch was acidified with hydrochloric acid to pH 3 and centrifuged, as in previous examples, and clear dry styrene beads were obtained.

Example IV

A suspension system comprising 8000 parts water, 5.5 parts calcium chloride, 71 parts trisodium phosphate, 6.5 parts sodium octyl sulfate, 4600 parts styrene monomer, 400 parts butadiene/styrene copolymer (75:20) and 18 parts benzoyl peroxide were charged to the reactor with continuous agitation, first adding 7500 parts of water, then the trisodium phosphate. The phosphate solution was heated to 90° C. with agitation and then the calcium chloride and sodium octyl sulfate, dissolved in the remaining 500 parts of water were added to form a finely divided suspension of calcium hydroxy hexaphosphate. 400 parts of well washed 75:25 butadiene/styrene copolymer (emulsion polymerized at low temperature) in 4400 parts of styrene monomer in which the benzoyl peroxide is dissolved and slowly added to the agitated phosphate suspension over a period of a half hour with good agitation, gradually increasing the temperature to about 100° C. The polymerization started at a pH of about 8 and gradually descended to about 6 in an hour following a curve as shown in FIG. 2D, at which point the slope of the pH curve leveled off sharply to horizontal, rising slightly over the next hour. After two hours the batch was divided into a control portion and an experimental portion. For the control portion the agitation and heating was continued. The pH gradually dropped as shown in that curve with the polymer beginning to coagulate upon the agitator, gradually forming a large polymeric soft "lollipop," thereby terminating in an unsuccessful batch. After the same two hour period, a further quantity of 0.5 part of benzoyl peroxide was added to the agitated experimental portion over a period of 15 minutes and the pH slowly dropped to about 6, and the polymerization was then continued over a period of 12 hours reaching a minimum pH of 5.7. After 15 hours the polymerization was terminated. The bead slurry was acidified to the pH of 3, centrifuged and the polymer beads were washed and dried showing clear resilient beads of good impact strength.

Example V

| | Parts (by weight) |
|---|---|
| Water | 5000 |
| Calcium chloride ($CaCl_2.2H_2O$) | 28 |
| Trisodium phosphate ($Na_3PO_4.12H_2O$) | 39 |
| Sodium octyl sulfate | 6 |
| Styrene monomer | 5000 |
| Benzoyl peroxide | 12.4 |
| Lecithin | 0.047 |
| Acetic acid | 0.29 |

4000 parts of water are heated to boiling and thereafter a boiling solution of 39 parts of trisodium phosphate and 6 parts of sodium octyl sulfate in 500 parts of water, is added to the first boiling batch with agitation and forms a clear homogeneous hot solution. Thereafter 28 parts of calcium chloride ($CaCl_2.2H_2O$) dissolved in 500 parts of water, heated to boiling, is slowly added to first the agitated boiling solution of trisodium phosphate over a period of a half hour, and the agitation is continued for an additional half hour. Thereafter, 5000 parts of styrene monomer having 12.5 parts of benzoyl peroxide and 0.05 part of lecithin dissolved therein are slowly added to the hot agitated suspension. The beads formed, following the procedure of Example I, were found to have a relatively constant particle size in the range of 40–60 mesh.

Example VI

Procedure of Example V was repeated except that the suspension of calcium phosphate was formed in situ as described but at a temperature of 60° C. It was found that a substantially constant particle size bead of slightly larger bead particles having a screen mesh size of 80–100 were formed.

As thus described it has been found that a reliably good suspension polymerization follows the profile of curve as set forth in FIG. 1 comprising a gradual drop of pH of the suspension system to a minimum of about 5.8, preferably in the range of 5.8 to 6.0, gradually rising thereafter. When a suspension polymerization reaction is regulated to follow such normal reaction curve, good, non-tacky strong transparent polymer beads are formed. Where in a normal suspension polymerization system a break in the pH-time profile curve appears, that break is clear indication that there is some fault in the polymerization. If that reaction is allowed to continue unchecked, the polymerization will be defective, "lollipops" will form at an intermediate stage, or sugar clumping will occur after bead granules are formed. However, if corrective measures are applied where a break in the curve appears, that batch can be saved. It is usually saved by measures applied prior to substantial coagulation of the suspension. The procedure involves first correction of the pH to that approximately normal for the curve, usually by addition of more catalyst to accelerate the polymerization.

Again, during the final finishing stages of the polymerization and when substantial polymerization has been effected whereby the product is substantially polymerized into beads, the beads may be tacky and tend to coagulate and adhere into sugar clumps at a pH below about 5.5. It is found that this may be prevented by addition in the final polymerization stages, of an alkaline substance to prevent the pH from going below 5.8, in quantity either to inhibit the lowering of the pH below that critical limit to stabilize it in the range of 5.6 or to slightly raise the pH.

In a preferred procedure, it is found that the polymer beads may be produced in more constant particle sizes by forming fine insoluble phosphate particles by precipitation in situ from hot solution of reagents to form the insoluble phosphate at a high temperature in the range of 90–100° C.

We claim:

1. In the suspension polymerization of styrene monomer catalyzed with a peroxy catalyst by agitation of a suspension of the styrene catalyzed monomer in water to form an agitated suspension of small liquid droplets which sometimes tend to coalesce into a large partially polymerized mass at an intermediate stage of the suspension polymerization, said tendency to coalesce being indicated further by an abnormal rise in pH of the suspension polymerization system, the step of adjusting the pH of the suspension system to a condition approximately normal for this suspension polymerization system when compared to an average pH-time profile curve having the form illustrated in FIG. 1, said adjustment of the pH being effected by adding to the suspension system a quantity sufficient to effect the necessary pH reduction of a substance selected from the group consisting of an acid, a peroxy catalyst and both an acid and a peroxy catalyst.

2. In the suspension polymerization of a liquid solution of synthetic rubber consisting essentially of a copolymer of butadiene and styrene, dissolved in styrene monomer catalyzed with a peroxy catalyst by agitation of a suspension of the styrene catalyzed monomer in water to form an agitated suspension of small liquid droplets which sometimes tend to coalesce into a large polymerization, said tendency to coalesce being indicated further by an abnormal rise in pH of the suspension polymerization system, the step of adjusting the pH of the suspension system to a condition approximately normal for this suspension polymerization system when compared to an average pH-time profile curve having the form illustrated in FIG. 1, said adjustment of the pH being effected by adding to the suspension system a quantity sufficient to effect the necessary pH reduction of a substance selected from the group consisting of an acid, a peroxy catalyst and both an acid and a peroxy catalyst.

3. In the suspension polymerization of a liquid solution of poly-acrylonitrile dissolved in styrene monomer catalyzed with a peroxy catalyst by agitation of a suspension of the styrene catalyzed monomer in water to form an agitated suspension of small liquid droplets which sometimes tend to coalesce into a large partially polymerized mass at an intermediate stage of the suspension polymerization, said tendency to coalesce being indicated further by an abnormal rise in pH of the suspension polymerization system, the step of adjusting the pH of the suspension system to a condition approximately normal for this suspension polymerization system when compared to an average pH-time profile curve having the form illustrated in FIG. 1, said adjustment of the pH being effected by adding to the suspension system a quantity sufficient to effect the necessary pH reduction of a substance selected from the group consisting of an acid, a peroxy catalyst and both an acid and a peroxy catalyst.

References Cited in the file of this patent

UNITED STATES PATENTS

| | | |
|---|---|---|
| 2,524,627 | Hohenstein | Oct. 3, 1950 |
| 2,594,913 | Grim | Apr. 29, 1952 |
| 2,687,408 | Grim | Aug. 24, 1954 |
| 2,688,004 | Lewis et al. | Aug. 31, 1954 |
| 2,734,883 | Bowell et al. | Feb. 14, 1956 |

FOREIGN PATENTS

| | | |
|---|---|---|
| 415,660 | Italy | Oct. 28, 1946 |

OTHER REFERENCES

Marvel et al.: Journal American Chemical Society, vol. 72, pages 5026–9 (1950).

Gould et al.: Industrial Engineering Chemistry, vol. 41, pages 1021–4 (1949).